Nov. 10, 1959

C. R. WILHELMSEN

AUTOMATIC-GAIN-CONTROL SYSTEM UTILIZING CONSTANT CURRENT SOURCE

Filed Sept. 19, 1955

2,912,572

2,912,572
Patented Nov. 10, 1959

2,912,572

AUTOMATIC-GAIN-CONTROL SYSTEM UTILIZING CONSTANT CURRENT SOURCE

Carl R. Wilhelmsen, Westbury, N.Y., assignor to Hazeltine Research, Inc., Chicago, Ill., a corporation of Illinois Application September 19, 1955, Serial No. 535,085

11 Claims. (Cl. 250—20)

Figure 1:
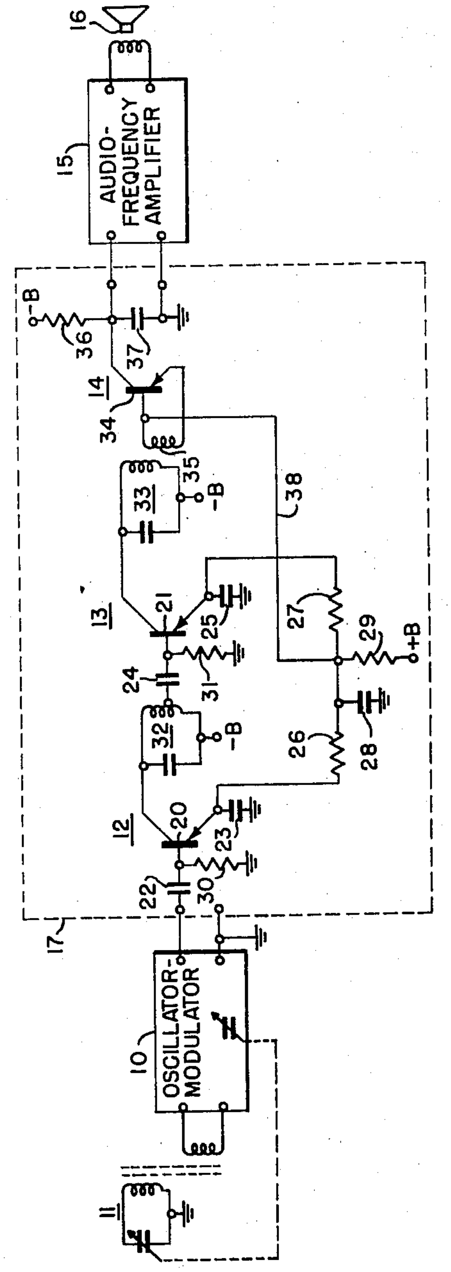

The present invention is directed to automatic-gain-control systems for signal-translating apparatus and, more particularly, to automatic-gain-control systems employing transistors for use in radio broadcast receivers. Accordingly, the invention will be described in the environment of a radio receiver.

Semiconductor signal-translating devices, commonly referred to as transistors, offer a number of advantages over electron tubes. Their use in both electronic devices and systems is being given widespread attention by equipment designers because of their very small size, lightness of weight, ruggedness, long operating life, extremely simple power requirements, and zero warm-up time. It would seem, therefore, that their use in radio broadcast receivers, particularly in those of the portable type, is extremely desirable.

Automatic-gain-control systems, sometimes referred to as automatic-volume-control systems, are employed in signal-translating apparatus such as radio receivers to maintain the signal input to the modulation-signal detector within a relatively narrow range for a wide range of received signal intensities, thereby minimizing any variations in the intensities of the output signal of the sound reproducer which are caused by atmospheric conditions such as fading or caused by tuning the receiver from a strong broadcasting station to a weaker one. Such systems are conventional in radio receivers employing electron tubes and it is considered desirable to employ them in transistorized radio receivers.

Receivers utilizing electron tubes usually employ diodes as the automatic-gain-control detector devices. The current translated by such a diode is small but, upon flowing through a relatively large resistor, develops sufficient voltage for application to the control electrodes of one or more electron tubes in the intermediate-frequency stages and/or the radio-frequency stages of a receiver. This developed voltage controls the gain of the stages just mentioned with negligible power consumption and maintains the signal input to the modulation-signal detector within a relatively narrow range for a wide range of received signal intensities.

It would initially appear that the techniques employed in automatic-gain-control systems using electron tubes could readily be carried over into automatic-gain-control systems for receivers employing transistors. However, the problem has proved to be quite complex because the input impedance of a transistor is lower than that of an electron tube so that more power must be delivered to the controlled stages employing transistors. The current flowing in the input circuits of the controlled stages is significant and must also be considered. Because of this complexity of the transistor, the use of transistor-type automatic-gain-control systems has been limited.

It is an object of the invention, therefore, to provide for use in a signal-translating apparatus a new and improved automatic-gain-control system employing transistors.

It is another object of the invention to provide for use in a transistorized radio receiver a new and improved automatic-gain-control system which is relatively simple in construction and inexpensive to manufacture.

It is a further object of the invention to provide a new and improved transistor-type automatic-gain-control system which effectively makes use of a characteristic of the transistor to develop an automatic-gain-control effect.

In accordance with a particular form of the invention, an automatic-gain-control system for a signal-translating apparatus comprises a transistor including an emitter and a base and having a nonlinear emitter current-current gain factor characteristic and a stage including that transistor for translating an applied wave signal. The system also includes a detector coupled to that stage and maintained in a predetermined conductivity state in the absence of the translated signal but responsive to variations in a characteristic thereof which modify the conductivity of the detector. The automatic-gain-control system further includes a pair of current-conducting paths including a substantially constant-current source common thereto, one of those paths being connected to the emitter in biasing relation to the aforesaid emitter and base to provide approximately a peak value of current gain factor when the emitter current is representative of a predetermined amplitude of the applied signal and the other of the paths being connected to the detector and responsive to the conductivity thereof for modifying the current division in those paths and thus modifying the current gain factor in a sense to maintain the aforesaid characteristic of the translated wave signal within a relatively narrow range for a wide range of applied wave-signal intensities.

For a better understanding of the present invention, together with other and further objects thereof, reference is had to the following description taken in connection with the accompanying drawing, and its scope will be pointed out in the appended claims.

Figure 2:
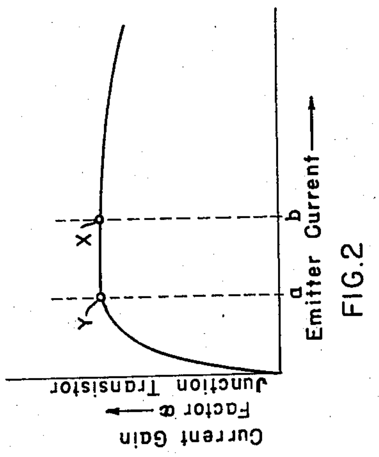

Referring to the drawing:

Fig. 1 is a circuit diagram, partly schematic, of a complete radio broadcast receiver which includes an automatic-gain-control system embodying the present invention in a particular form, and Fig. 2 is a characteristic curve of a junction-type transistor.

*General description of Fig. 1 receiver*

Referring now to Fig. 1 of the drawing, there is represented a complete radio-broadcast receiver which utilizes an automatic-again-control system embodying a particula form of the present invention. In general, the receiver includes a frequency converter or oscillator-modulator 10 having a received wave-signal input circuit constituting an antenna system such as one commonly referred to in the art as a "ferrite-rod antenna" 11, and having its output circuit coupled to an intermediate-frequency amplifier of one or more stages. The intermediate-frequency amplifier preferably includes a pair of cascade- or tandem-connected stages 12 and 13 which are in turn connected in cascade with a modulation-signal detector 14, an audio-frequency amplifier 15, and a sound-reproducing device 16. The oscillator-modulator mentioned above may be of any well-known construction but, when a transistor is employed therein, preferably is of the type described and claimed in the copending application of the applicant and Sylvan Sherman, Serial No. 506,336, filed May 5, 1955, and entitled "Frequency Converter." While the detector 14 may be one of the type for deriving the modulation-signal components of an amplitude-modulated wave signal or one for deriving the modulation-signal components of a frequency-modulated wave signal, for the purpose of describing a particular embodiment of the present invention, it will be considered to be a detector for amplitude-modulated wave signals. One or both of the intermediate-frequency amplifier stages 12 and 13 in conjunction with the detector 14 constitute an automatic-gain-control system 17 in accordance with the present invention for deriving a suitable control effect to maintain the amplitude of the signal input to the detector 14 within a relatively narrow range for a wide range of received signal intensities.

It will be understood that the units 10, 11, 15, and 16 just described may be of conventional construction and operation, the details of which are well known in the art so that further detailed description and explanation of the operation thereof are unnecessary.

*General operation of Fig. 1 receiver*

Considering briefly the operation of the Fig. 1 receiver as a whole, but neglecting for the moment the details of the automatic-gain-control portion of the system 17 which will be explained subsequently, a desired amplitude-modulated wave signal intercepted by the antenna 11 is applied to the oscillator-modulator 10, and is converted by the latter to an amplitude-modulated intermediate-frequency wave signal signal which is translated by the output circuit of unit 10 to the cascade-connected intermediate-frequency amplifier stages 12 and 13 for amplification therein. The output signal of the intermediate-frequency amplifier stage 13 is applied to the detector 14 which derives the audio-frequency modulation components of the received wave signal. These components are, in turn, amplified by the audio-frequency amplifier 15 and are reproduced by the sound-reproducing device 16 in a conventional manner. The automatic-amplification-control or AVC bias derived by the unit 17 in a manner to be explained subsequently is effective to maintain the intensity of the signal input to the detector 14 within a relatively narrow range for a wide range of received signal intensities.

*Description of automatic-gain-control system 17*

The automatic-gain-control system 17 for the signal-translating apparatus or radio receiver of Fig. 1 comprises first and second transistors 20 and 21 having a nonlinear emitter current-current gain factor characteristic. Junction transistors have a suitable characteristic of this type. Accordingly, the transistors map employ N–P–N type of semiconductive material such as germanium, or may utilize the P–N–P type thereof. The transistors presented for consideration in the automatic-gain-control system 17 of Fig. 1 are of the P–N–P type. It will be understood that the transistors may be of the grown-junction type, the alloy-junction type, or other suitable junction types. Fig. 2 represents a typical emitter current-current gain factor characteristic of a P–N–P junction transistor.

The intermediate-frequency amplifier stage 12, including the transistor 20 for translating the wave signal applied thereto by the oscillator-modulator 10, has an emitter-base circuit biased to provide approximately a peak value of current-gain factor $\alpha$ when the emitter current therein is representative of a predetermined amplitude, namely, substantially the lowest usable amplitude of the applied wave signal in the absence of a control effect applied to that stage. The transistor 20 is base fed, that is, the input signal is applied to the base connection through a coupling condenser 22, and the emitter connection is maintained by a condenser 23 at a fixed or ground potential for intermediate-frequency wave signals. The transistor 21 of stage 13 is also base fed through a coupling condenser 24, in a manner to be described subsequently, while its emitter connection, like that of the transistor 20, is connected to ground through an intermediate-frequency by-pass condenser 25. The emitter connections of the transistors 20 and 21 are interconnected through first and second resistors 26 and 27, the junction of the resistors being connected to ground through an audio-frequency by-pass condenser 28. The emitter-base circuits of the transistors just mentioned are biased in the forward direction by a source of positive potential indicated as +B which is connected to the junctions of the first and second resistors 26 and 27 through a third resistor 29. The base connections of the transistors 20 and 21 are connected to ground through resistors 30 and 31. Resistor 26 preferably has a larger resistance than that of resistor 27 for a purpose to be explained subsequently. The resistor 29 preferably has a resistance about two orders of magnitude (i.e. about twenty times) greater than the internal emitter-base resistance of either of the transistors 20 and 21. In one receiver of the type under consideration, the resistance of resistor 29 was 10,000 ohms while that for the internal emitter-base resistance of a junction transistor was 1,000 ohms. The values of the resistors in the emitter-base circuits of the transistors 20 and 21 are chosen so that the potentials of the emitter connections are slighly positive, the potentials of the base connections are at approximately ground potential, and so that when the emitter current flowing in the transistors is representative of substantially the lowest amplitude of the wave signal applied to unit 17, the current-gain factor $\alpha$ of the transistors has approximately a peak value. The bias is preferably such that for substantially the lowest usable amplitude of the applied intermediate-frequency wave signal, the transistors are operating at about point X represented in Fig. 2 of the drawing.

The collector connection of the transistor 20 is connected through a tuned circuit 32, which is resonant at the intermediate frequency, and through a coupling condenser 24 to the base connection of the transistor 21 while the collector connection of the latter is coupled through a similarly tuned circuit 33 to the detector 14. The collector connections of the transistors 20 and 21 are biased in the reverse direction through the windings of the tuned circuits just mentioned from a potential source indicated as —B.

The detector 14, which is responsive to a characteristic, namely, to the average amplitude of the wave signal translated by the intermediate-frequency amplifier stages 12 and 13, not only is employed to derive a direct-current control effect having a magnitude which varies in a predetermined sense with predetermined variations constituting the average amplitude of the translated wave signal, but also is preferably utilized to derive the modulation components of that signal. To that end, the detector comprises a transistor 34 having its base- and emitter-input connections inductively coupled to the tuned circuit 33 through a winding 35. The transistor 34 is biased substantially to cutoff in the absence of the application thereto of a wave signal by the tuned circuit 33. For some applications, however, it may be desirable to employ a slightly forward bias on the emitter connection of the transistor 34 in order to bias the detector at the sharpest break or region of most curvature of the emitter voltage-current relation. The collector connection is biased in the reverse direction from a source indicated as —B connected to the collector connection through a resistor 36. The collector connection is by-passed to ground for intermediate-frequency signals by condenser 37 and coupled to the input circuit of the audio-frequency amplifier 15.

The automatic-gain-control system 17 also includes means coupled to the detector 14 and the emitter circuits of the intermediate-frequency amplifier stages 12 and 13 for applying the control effect derived by the detector 14 to the intermediate-frequency amplifier stages 12 and 13 to vary the emitter currents thereof and, thus, the current-gain factor thereof, in a sense to maintain the aforesaid characteristic, that is, the average amplitude of the signal translated by the intermediate-frequency amplifier stages, within a relatively narrow range for a wide range of applied wave-signal intensities. This means includes the resistor 29 which is common to the emitter circuits of units 12, 13, and 14 and also includes the conductive connection 38 between the base connection of the transistor 34 and the junction of the resistors 26, 27, and 29.

*Explanation of operation of AGC system 17*

Prior to considering the details of the operation of the AGC system 17 of Fig. 1, it may be stated that junction transistors have a current gain factor $\alpha$ from the emitter connection to the collector connection that it is slightly less than unity. This current gain factor, which is similar to the amplification factor or $\mu$ of a triode electron tube, is fairly constant over the usual operating range of a junction transistor. Such a range is that represented in the region to the right of the point Y of the curve of Fig. 2. When a transistor is base fed as are those represented in Fig. 1, the current gain from the base connection to the collector connection may be expressed by the relation $$\frac{\alpha}{1-\alpha}$$

This manner of feeding or applying a signal to a transistor not only increases the current gain but also allows a considerable change in gain for relatively small changes in $\alpha$. In a typical junction transistor having a high current gain factor $\alpha$, this factor may be 0.975 at 1 milliampere of emitter current and may fall off to 0.900 at about 100 microamperes of emitter current. By feeding the base connection, the current gain changes from $$\frac{0.975}{1-0.975}=39$$

at 1 milliampere to $$\frac{0.9}{1-0.9}=9$$

at 100 microamperes, thus affording about 13 decibels less gain. Thus, by proper reduction of the emitter current of a transistor connected in the correct circuit environment, an automatic-gain-control action may be realized.

For the condition wherein no usable intermediate-frequency signal is applied to the input circuit of unit 17, the intermediate-frequency amplifier stages 12 and 13 are effectively constant emitter current biased in the region of pint X of Fig. 2 and the current gain factor of the transistors 20 and 21 is large. However, under this "no-signal" condition, the detector 14 is effectively biased to cutoff and no direct-current emitter current flows in the transistor 34. The total emitter current of the transistors 20 and 21 flows in the resistor 29 while that of transistor 20 flows in resistor 26 and that of transistor 21 flows in resistor 27. When an intermediate-frequency signal having a low usable amplitude is applied to the system 17, it is amplified in a conventional manner by intermediate amplifier stages 12 and 13 and applied to the detector 14, thus causing a flow of emitter current in the latter. The emitter-base circuit of the transistor 34 effectively acts as a diode and rectifies the positive-going components of the amplitude-modulated wave signal applied thereto, and the derived modulation components thus produced are amplified by the action of the transistor as a whole so that the amplified components are translated by the collector circuit to the audio-frequency amplifier 15.

The application of the signal mentioned above to the emitter-base circuit of the transistor 34 changes the impedance of that circuit from an extremely high or open-circuit value to a low value which, for purposes of explanation, may be considered to be about 100 ohms. Current flowing in the resistor 29, which previously was divided between the resistors 26 and 27, now is shared by the resistors 26 and 27 in conjunction with the emitter circuit of the transistor 34. The magnitude of the current flowing in the resistor 29 remains substantially the same because its resistance is, as previously stated, about two orders of magnitude greater than the small internal emitter-base resistance of the transistors 20 and 21. Consequently, the emitter-base circuit of the transistor 34 of the detector 14 appropriates or robs current from the emitter circuits of the two-intermediate-frequency amplifier stages.

For intermediate-frequency wave signals of rather low useful values having an increasing average amplitude, the emitter current of the transistors 20 and 21 decreases as between values *a* and *b* of Fig. 2 which correspond with the points X and Y on the crest of the curve. It will be observed that the current gain factor $\alpha$ does not decrease materially in this region until the emitter current reaches the point Y, at which time the current gain factor decreases quite abruptly. Thus, as the emitter currents of the intermediate-frequency amplifiers 12 and 13 decrease in the region between points X and Y, an effective delay in the automatic-gain-control action of the system 17 takes place with reference to the intermediate-frequency signal applied to the detector 14. As the average amplitude of the intermediate-frequency wave signal applied to the unit 17 continues to increase, the emitter current of the detector 14 further increases and continues to rob the transistors 20 and 21 of the controlled intermediate-frequency amplifier stages 12 and 13 of emitter current so that they are operating in the region to the left of point Y on the curve of Fig. 2. The current gain factor of transistors 20 and 21 decreases sharply, thus reducing the strength of the intermediate-frequency wave signal applied to the detector 14. This described automatic-gain-control action is effective to maintain the average amplitude of the signal applied to the detector 14 within a relatively narrow range for a wide range of applied wave-signal intensities. Since the resistor 26 has a resistance which is larger than that of resistor 27, the transistor 20 of the first intermediate-frequency amplifier stage 12 will reach cutoff before the second stage 13. This action will prevent any serious large signal distortion in the deceiver as the automatic-gain-control system functions. The fact that resistor 26 is larger than resistor 27 also serves another purpose. Some signal of the frequency of the local oscillator of unit 10 may be present in the base-emitter circuit of stage 12. This signal may be detected by the transistor 20 as the latter approaches cutoff and thus provide some forward bias. This forward bias would prevent the stage 12 from reaching cutoff as rapidly as it would if no local oscillator signal were present. Consequently, it is desirable for this reason also that resistor 26 be larger than resistor 27 to assure the earlier cutoff of stage 12.

From the foregoing explanation, it will be seen that the detector in an automatic-gain-control system of the type described is capable of providing the modulation components of an applied intermediate-frequency wave signal, an amplified replica of those components, and a control effect on one or more of the intermediate-frequency amplifier stages. Furthermore, the detector and its associated intermediate-frequency amplifier stages are very simple in construction and economical to operate. By using a transistor as the detector, a high gain from base connection to collector connection is realized which cannot be achieved with a diode-type detector.

While applicant does not wish to limit the invention to any specific circuit constants, the following constants are given as illustrative of various of the circuit elements which may be used in the automatic-gain-control system of Fig. 1.

| | |
|---|---|
| Resistor 26 kilohms | 5.6 |
| Resistor 27 do | 4.7 |
| Resistor 29 do | 10 |
| Resistors 30 and 31 do | 22 |
| Resistor 36 do | 6 |
| Condensers 22 and 24 microfarad | 0.0015 |
| Condensers 23 and 25 do | 0.02 |
| Condenser 28 microfarads | 2 |
| Condenser 37 microfarad | 0.01 |
| Transistors 20, 21, and 34 | P–N–P junction transistors, R.C.A. type TA–153 or 2N34 |
| +B volts | +22.5 |
| —B do | —22.5 |
| Intermediate frequency | about 100 kilocycles |

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An automatic-gain-control system for a signal-translating apparatus comprising: a transistor including an emitter and a base and having a nonlinear emitter current-current gain factor characteristic; a stage including said transistor for translating an applied wave signal; a detector coupled to said stage and maintained in a predetermined conductivity state in the absence of said translated signal but responsive to variations in a characteristic thereof which modify the conductivity of said detector; and a pair of current-conducting paths including a substantially constant-current source common thereto, one of said paths being connected to said emitter in biasing relation to said emitter and base to provide approximately a peak value of current gain factor when the emitter current is representative of a predetermined amplitude of said applied signal and the other of said paths being connected to said detector and responsive to said conductivity thereof for modifying the current division in said paths and thus modifying said current gain factor characteristic in a sense to maintain said characteristic of said translated signal within a relatively narrow range for a wide range of applied wave-signal intensities.

2. An automatic-gain-control system for a signal-translating apparatus comprising: a transistor including an emitter and a base and having a nonlinear emitter current-current gain factor characteristic; a stage including said transistor for translating an applied wave signal; a detector coupled to said stage and maintained in in a predetermined conductivity state in the absence of said translated signal but responsive to variations in the average amplitude thereof which modify the conductivity of said detector; and a pair of current-conducting paths including a substantially constant-current source common thereto, one of said paths being connected to said emitter in biasing relation to said emitter and base to provide approximately a peak value of current gain factor when the emitter current is representative of the lowest usable amplitude of said applied signal and the other of said paths being connected to said detector and responsive to said conductivity thereof for modifying the current division in said paths and thus modifying said current gain factor characteristic in a sense to maintain said average amplitude of said translated signal within a relatively narrow range for a wide range of applied wave-signal intensities.

3. An automatic-gain-control system for a radio receiver comprising: a junction transistor including an emitter and a base and having a nonlinear emitter current-current gain factor characteristic; a stage including said transistor for translating a received modulated wave signal; a detector coupled to said stage and maintained in a predetermined conductivity state in the absence of said translated signal but responsive to variations in the average amplitude thereof which modify the conductivity of said detector; and a pair of current-conducting paths including a substantially constant-current source common thereto, one of said paths being connected to said emitter in biasing relation to said emitter and base to provide approximately a peak value of current gain factor when the emitter current is representative of the lowest usable amplitude of said applied signal and the other of said paths being connected to said detector and responsive to said conductivity thereof for modifying the current division in said paths and thus modifying said current gain factor characteristic in a sense to maintain said average amplitude of said translated signal within a relatively narrow range for a wide range of applied wave-signal intensities.

4. An automatic-gain-control system for a signal-translating apparatus comprising: a transistor including an emitter and a base and having a nonlinear emitter current-current gain factor characteristic; a stage including said transistor for translating an applied wave signal; a detector coupled to said stage and maintained in a predetermined conductivity state in the absence of said translated signal but responsive to variations in the average amplitude thereof which modify the conductivity of said detector; and a pair of current-conducting paths including a substantially constant-current source with a resistive impedance common to said paths, one thereof being connected to said emitter in biasing relation to said emitter and base to provide approximately a peak value of current gain factor when the emitter current is representative of the lowest usable amplitude of said applied signal and the other of said paths being connected to said detector and responsive to said conductivity thereof for modifying the current division in said paths and thus modifying said current gain factor characteristic in a sense to maintain said average amplitude of said translated signal within a relatively narrow range for a wide range of applied wave-signal intensities.

5. An automatic-gain-control system for a signal-translating apparatus comprising: a transistor including an emitter and a base and having a nonlinear emitter current-current gain factor characteristic; a stage including said transistor for translating an applied wave signal; a detector coupled to said stage and maintained in a predetermined conductivity state in the absence of said translated signal but responsive to variations in the average amplitude thereof which modify the conductivity of said detector; and a pair of current-conducting paths including a substantially constant-current source with a resistive impedance common to said paths and having a resistance from ten to twenty times greater than the internal emitter-base impedance of said transistor, one of said paths being connected to said emitter in biasing relation to said emitter and base to provide approximately a peak value of current gain factor when the emitter current is representative of the lowest usuable amplitude of said applied signal and the other of said paths being connected to said detector and responsive to said conductivity thereof for modifying the current division in said paths and thus modifying said current gain factor characteristic in a sense to maintain said average amplitude of said translated signal within a relatively narrow range for a wide range of applied wave-signal intensities.

6. An automatic-gain-control system for a signal-translating apparatus comprising: a transistor including an emitter and a gase and having a nonlinear emitter current-current gain factor characteristic; a stage including said transistor for translating an applied wave signal; a detector coupled to said stage and maintained in a predetermined conductivity state in the absence of said translated signal but responsive to variations in the average amplitude thereof which modify the conductivity of said detector; and a pair of current-conducting paths including a substantially constant-current source common thereto, one of said paths being connected to said emitter in biasing relation to said emitter and base to provide approximately a peak value of current gain factor when the emitter current is representative of the lowest usable amplitude of said applied signal, said current gain factor remaining substantially constant when the amplitude of said applied wave signal increases over a small range above said lowest usable amplitude and then decreasing abruptly when said amplitude increases above said small range, and the other of said paths being connected to said detector and responsive to said conductivity thereof for modifying the current division in said paths and thus modifying said current gain factor characteristic in a sense to maintain said average amplitude of said translated signal within a relatively narrow range for a wide range of applied wave-signal intensities.

7. An automatic-gain-control system for a signal-translating apparatus comprising: a pair of transistors each including an emitter and a base and having a nonlinear emitter current-current gain factor characteristic; a pair of cascade-connected stages including said transistors for translating an applied wave signal; a detector coupled to said stages and maintained in a predetermined conductivity state in the absence of said translated signal but responsive to variations in the average amplitude thereof which modify the conductivity of said detector; and three current-conducting paths including a substantially constant-current source common thereto, two of said paths being connected respectively to said emitters in biasing relation to said emitters and bases to provide approximately a peak value of current gain factor when the emitter currents are representative of the lowest usable amplitude of said applied signal and the other of said paths being connected to said detector and responsive to said conductivity thereof for modifying the current division in said paths and thus modifying said current gain factor characteristic in a sense to maintain said average amplitude of said translated signal within a relatively narrow range for a wide range of applied wave-signal intensities.

8. An automatic-gain-control system for a radio receiver comprising: a transistor including an emitter and a base and having a nonlinear emitter current-current gain factor characteristic; a stage including said transistor for translating a received modulated wave signal; a detector coupled to said stage for deriving the modulation components of said translated signal and biased substantially to cutoff in the absence of said translated signal but responsive to variations in the average amplitude thereof which modify the conductivity of said detector; and a pair of current-conducting paths including a substantially constant-current source common thereto, one of said paths being connected to said emitter in biasing relation to said emitter and base to provide approximately a peak value of current gain factor when the emitter current is representative of the lowest usable amplitude of said applied signal and the other of said paths being connected to said detector and responsive to said conductivity thereof for modifying the current division in said paths and thus modifying said current gain factor characteristic in a sense to maintain said average amplitude of said translater signal within a relatively narrow range for a wide range of applied wave-signal intensities.

9. An automatic-gain-control system for a signal-translating apparatus comprising: a first transistor including an emitter and a base and having a nonlinear emitter current-current gain factor characteristic; a stage including said transistor for translating an applied wave signal; a detector, including a second transistor having an emitter-base input circuit operating without bias and coupled to said stage, responsive to variations in the average amplitude of said translated signal which modify the conductivity of said detector; and a pair of current-conducting paths including a substantially constant-current source common thereto, one of said paths being connected to said emitter in biasing relation to said emitter and base of said first transistor to provide approximately a peak value of current gain factor when the emitter current thereof is representative of the lowest usable amplitude of said applied signal and the other of said paths being connected to said input circuit of said detector and responsive to said conductivity thereof for modifying the current division in said paths and thus modifying said current gain factor characteristic in a sense to maintain said average amplitude of said translated signal within a relatively narrow range for a wide range of applied wave-signal intensities.

10. An automatic-gain-control system for a signal-translating apparatus comprising: first and second transistors each including an emitter and a base and having a nonlinear emitter current-current gain factor characteristic; a pair of cascade-connected stages including said transistors for translating an applied wave signal; a detector coupled to said stages and maintained in a predetermined conductivity state in the absence of said translated signal but responsive to variations in the average amplitude thereof which modify the conductivity of said detector; and three current-conducting paths including a substantially constant-current source common thereto, two of said paths being connected respectively to said emitters in biasing relation to said emitter and base of each of said transistors to provide approximately a peak value of current gain factor thereof when the emitter currents thereof are representative of the lowest usable amplitude of said applied signal and the third of said paths being connected to said detector and responsive to said conductivity thereof for modifying the current division in said paths and thus modifying said current gain factor characteristic in a sense to maintain said average amplitude of said translated signal within a relatively narrow range for a wide range of applied wave-signal intensities.

11. An automatic-gain-control system for a signal-translating apparatus comprising: first and second transistors each including an emitter and a base and having a nonlinear emitter current-current gain factor characteristic; first, second, and third resistors, said first resistor having a larger resistance than said second and third resistors; a pair of cascade-connected stages including said transistors for translating an applied wave signal; a detector coupled to said stage and maintained in a predetermined conductivity state in the absence of said translated signal but responsive to variations in the average amplitude thereof which modify the conductivity of said detector; and three current-conducting paths each including a substantially constant-current source common thereto which comprises said first resistor and a battery, a first of said paths including said second resistor and a second thereof including said third resistor and both paths being connected respectively to said emitters in biasing relation to said emitters and bases of each of said transistors to provide approximately a peak value of current gain factor when the emitter currents thereof are representative of the lowest usable amplitude of said applied signal and the third of said paths being connected to said detector and responsive to said conductivity thereof for modifying the current division in said paths and thus modifying said current gain factor characteristics of said transistors in a sense to maintain said average amplitude of said translated signal within a relatively narrow range for a wide range of applied wave-signal intensities.

References Cited in the file of this patent

UNITED STATES PATENTS

| | | |
|---|---|---|
| 2,041,150 | Roberts | May 19, 1936 |
| 2,041,291 | Johnson | May 19, 1936 |
| 2,046,144 | Anders | June 30, 1936 |
| 2,086,465 | Brown | July 6, 1937 |
| 2,841,702 | Barton | July 1, 1958 |

OTHER REFERENCES

Electronics for March 1955, pp. 159, 161, 160.

Radio and Television News for April 1955, p. 39.

Proceedings of I.R.E. for June 1955, pp. 671–678.

Proceedings of I.R.E. for June 1955, pp. 622–670.

Pub. V—I.R.E. Trans. on BC and TV Receivers, vol. BTR–1 No. 2, April 1955, pages 1–15, presented at I.R.E.—RGTMA Radio Fall Meeting, October 18–20, 1954, Syracuse, N.Y.